R. J. MORTON.
Stirrer for Coffee-Roasters.
No. 225,758.   Patented Mar. 23, 1880.
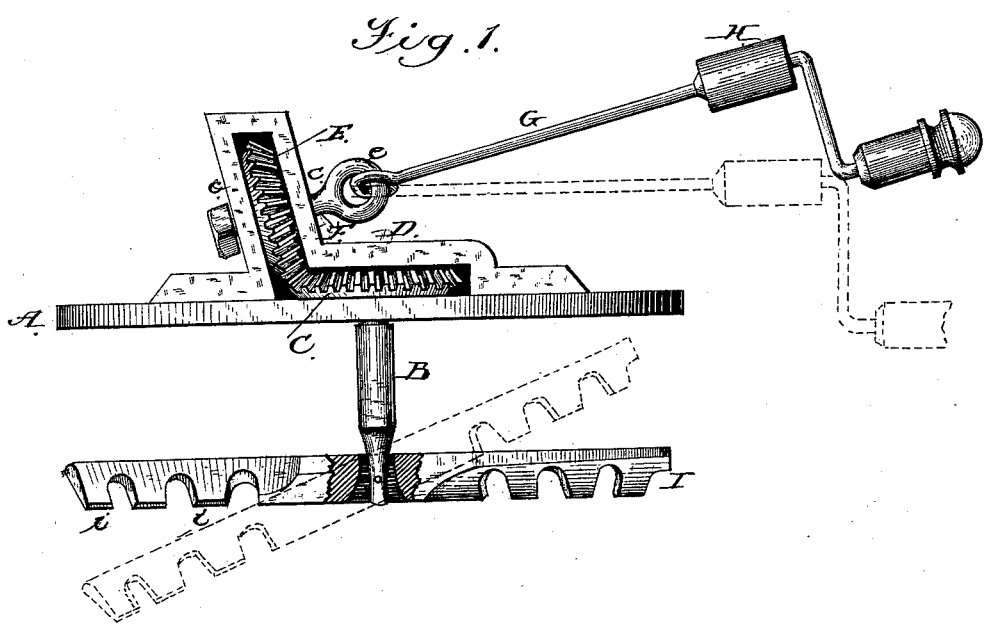
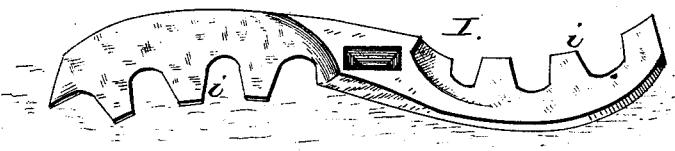
Attest:
J. Walter Fowler
W. H. Morsell
Inventor:
Rufus J. Morton
by
A. H. Evans & Co
Attorney's

UNITED STATES PATENT OFFICE.

RUFUS J. MORTON, OF BIG LICK, NORTH CAROLINA.

STIRRER FOR COFFEE-ROASTERS.

SPECIFICATION forming part of Letters Patent No. 225,758, dated March 23, 1880.

Application filed January 3, 1880.

*To all whom it may concern:*

Be it known that I, RUFUS J. MORTON, of Big Lick, Stanly county, State of North Carolina, have invented an Improvement in Stirrers for Coffee-Roasters; and I hereby declare the following to be a full, clear, and exact description thereof, reference being had to the accompanying drawings, making part of this specification, and in which—

Figure 1 is a side elevation of a stirrer with my improvements attached. Fig. 2 is a view of the stirrer detached from the shaft.

The object of my invention is to produce a stirrer by which the coffee or other similar article can be thoroughly and easily stirred while under cover without unnecessarily exposing the person to the heat of the fire, regardless of the position of the vessel on the stove or fire; and it consists in the combination of devices hereinafter explained and claimed.

In the drawings, A represents the lid to be placed on the skillet or other vessel in which is the material to be stirred. Through this lid works the vertical shaft B, provided on its upper end with the rigidly-attached cog-wheel C, and having a bearing in the bent plate D, secured to the upper surface of the lid. Between the portions $c$ $c$ of the bent plate C is secured the cogged wheel E, on the short shaft F, and meshing with the wheel C. To the eye $e$, on the end of the shaft F, is loosely attached the long crank-handle G, carrying the loose spool H, as shown in the drawings.

It is evident from this construction that by revolving the crank shaft or handle G it will cause the vertical shaft B to revolve by means of the gearing C and G; and it is also evident that the position of the handle may be greatly varied to suit the convenience and comfort of the operator, who holds the spool H in one hand and turns the handle G with the other.

To the lower end of the vertical shaft B, I pivot or otherwise loosely secure the S-shaped stirrer I, provided with the downwardly-inclined teeth $i$, as shown in Fig. 2, whereby the coffee is prevented from crowding to the outer edge of the vessel. By this construction a slight variation from a horizontal plane is allowed the stirrer I, as shown in Fig. 1, whereby the two halves of the stirrer are constantly changing their planes and securing a thorough stirring of the coffee.

Having thus described my invention, what I claim as new, and desire to secure by Letters Patent, is—

The stirring-blade I, provided with reversely-arranged downwardly-projecting teeth $i$ $i$, and loosely pivoted to the shaft B, the shaft B, gear C, and gear E, in combination with the short shaft F, provided with the eye $e$, and the swiveled crank-shaft G and bearing-block H, all constructed, arranged, and operated as set forth.

In testimony whereof I hereunto set my hand in the presence of two witnesses.

RUFUS JOSHUA MORTON.

Attest:
ROBERT H. GRIFFIN,
EPHRAIM N. HARTSELL.